United States Patent [19]
Rapp

[11] Patent Number: 6,077,798
[45] Date of Patent: *Jun. 20, 2000

[54] BIOSOLUBLE, HIGH TEMPERATURE MINERAL WOOLS

[75] Inventor: Charles F. Rapp, Newark, Ohio

[73] Assignee: Owens Corning Fiberglas Technology, Inc., Summit, Ill.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/691,780

[22] Filed: Aug. 2, 1996

[51] Int. Cl.[7] .................... C03C 3/078; C03C 3/087; C03C 13/06; C03C 13/02
[52] U.S. Cl. .................... 501/36; 501/38; 501/70
[58] Field of Search .................... 501/35, 36, 38, 501/70

[56] References Cited

U.S. PATENT DOCUMENTS

| | | |
|---|---|---|
| Re. 29,388 | 9/1977 | Atkinson . |
| 2,693,668 | 11/1954 | Slayter . |
| 2,877,124 | 3/1959 | Welsch . |
| 2,882,173 | 4/1959 | Welsch . |
| 3,060,041 | 10/1962 | Loewenstein . |
| 3,736,162 | 5/1973 | Chvalovsky et al. . |
| 4,090,882 | 5/1978 | Rauschenfels . |
| 4,205,992 | 6/1980 | Mogensen et al. ........... 501/36 |
| 4,243,421 | 1/1981 | Kume . |
| 4,277,286 | 7/1981 | Boyd et al. . |
| 4,325,724 | 4/1982 | Froberg . |
| 4,510,252 | 4/1985 | Potter . |
| 4,552,850 | 11/1985 | Partington et al. . |
| 4,652,535 | 3/1987 | Mackenzie et al. . |
| 5,055,428 | 10/1991 | Porter . |
| 5,250,488 | 10/1993 | Thelohan et al. . |
| 5,332,698 | 7/1994 | Nyssen et al. . |
| 5,332,699 | 7/1994 | Olds et al. .................. 501/36 |
| 5,401,693 | 3/1995 | Bauer et al. . |
| 5,576,252 | 11/1996 | Rapp et al. ................. 501/35 |
| 5,583,080 | 12/1996 | Guldberg et al. ............ 501/36 |
| 5,614,449 | 3/1997 | Jensen ....................... 501/38 |
| 5,691,255 | 11/1997 | Jensen et al. ............... 501/36 |
| 5,843,854 | 12/1998 | Karpinnen et al. ........... 501/35 |

FOREIGN PATENT DOCUMENTS

| | | |
|---|---|---|
| 412878 | 2/1991 | France . |
| 4417230 | 11/1995 | Germany . |
| 4417231 | 11/1995 | Germany . |
| WO 89/12032 | 12/1989 | WIPO . |
| 92/09536 | 6/1992 | WIPO . |
| WO 93/02977 | 2/1993 | WIPO . |
| 93/22251 | 11/1993 | WIPO . |
| WO 94/14717 | 7/1994 | WIPO . |
| WO 94/14718 | 7/1994 | WIPO . |
| 94/23801 | 10/1994 | WIPO . |
| WO 95/01941 | 1/1995 | WIPO . |
| 95/29135 | 11/1995 | WIPO . |
| WO 95/31411 | 11/1995 | WIPO . |
| WO 95/32925 | 12/1995 | WIPO . |
| WO 95/32926 | 12/1995 | WIPO . |
| WO 95/32927 | 12/1995 | WIPO . |
| WO 95/35265 | 12/1995 | WIPO . |
| WO 96/00196 | 1/1996 | WIPO . |

OTHER PUBLICATIONS

Reprint from Glastechnische Berichte, International Joirnal of Glass Science and Technology, vol. 64 (1991), "Glass fiber dissolution in a physiological saline solution" by Russell M. Potter and Stephanie M. Mattson, no month.

*Primary Examiner*—Mark L. Bell
*Assistant Examiner*—David Sample
*Attorney, Agent, or Firm*—Inger H. Eckert; Stephen W. Barns

[57] ABSTRACT

A mineral fiber is disclosed having a composition including the following components in about the indicated weight percents:

| | |
|---|---|
| $SiO_2$ | 48–64 |
| $Al_2O_3$ | 0–6 |
| MgO | 21–31 |
| CaO | 11–20 |
| Iron Oxide (as FeO) | 4.2–8 |
| $K_2O$ | 0–5 |
| $Na_2O$ | 0–5 |
| $TiO_2$ | 0–3 | wherein the total weight of $Na_2O$ and $K_2O$ does not exceed 5% and the total weight of all components, including trace elements, if any, is 100%.

20 Claims, No Drawings

BIOSOLUBLE, HIGH TEMPERATURE MINERAL WOOLS

FIELD OF THE INVENTION

This invention relates to mineral fibers and their compositions. In particular, this invention relates to high temperature resistant mineral fibers having improved biosolubility.

BACKGROUND OF THE INVENTION

Mineral fiber insulation is well known and has been a commercial product for an extended period of time. The insulation is typically made from rock or slag fibers often referred to as mineral wool or rock wool. The insulation is made from a calcium magnesium aluminum silicate glass. It is produced by melting a mixture of various slags and/or rock wool raw materials in a coke fired cupola. Alternatively, the raw materials can be melted in an electric or gas heated furnace. After the raw materials have been melted together, the wool is produced by either a multi-wheel centrifuge apparatus or by a Downey apparatus. Typically, if the fibers produced from this glass material are used as an insulation material, they are bound together by phenolic resins.

Previously in the art, insulation products were formed from asbestos fibers. Asbestos fibers, when inhaled, may cause disease in humans. Although the exact mechanism responsible for the biological activity of inhaled asbestos fibers is unknown, it is believed that their long residence time in the lung contributes to their ability to cause disease. Although mineral fibers have not been linked to disease in humans and their residence time in the human lung appears to be much shorter than that of asbestos fibers, it has become desirable to produce a mineral wool having an improved biosolubility.

One would expect that increasing the solubility of the mineral wool fibers would decrease the time the mineral wool fibers would remain in a human lung if they were inhaled. The dissolution rate of wool fibers in saline solutions similar to those existing in a human lung can be significantly increased by altering the chemical composition of the fiber, but there remains the problem of accomplishing this in such a way that other important properties of the mineral wool for commercial purposes are unimpaired.

SUMMARY OF THE INVENTION

The above object as well as other objects not specifically enumerated are accomplished by a mineral fiber of the present invention, having a composition comprising the following compounds in about the indicated weight percents:

| | |
|---|---|
| $SiO_2$ | 48–64 |
| $Al_2O_3$ | 0–6 |
| MgO | 21–31 |
| CaO | 11–20 |
| Iron Oxide (as FeO) | 4.2–8 |
| $K_2O$ | 0–5 |
| $Na_2O$ | 0–5 |
| $TiO_2$ | 0–3 | wherein the total weight of $Na_2O$ and $K_2O$ does not exceed 5% and the total weight of all components, including trace elements, if any, is 100%.

DETAILED DESCRIPTION AND PREFERRED EMBODIMENT OF THE INVENTION

The present invention provides glass compositions which can be used to produce a mineral fiber wool having a high temperature resistance and improved biosolubility. These mineral fiber compositions have increased dissolution rates in physiological saline solutions thought to be similar to those found in a human lung. Along with these characteristics, the compositions of this invention have advantageous forming properties for use with a multi-wheel centrifuge apparatus or a Downey apparatus for manufacturing wool and refractory ceramic fibers. The fibers manufactured from the glass compositions of this invention are suitable for any use for which such fibers are used and are particularly suitable for use in residential, commercial or industrial insulation products.

The compositions of this invention include the following components, in about the indicated weight percents (as is standard practice in the art, the components are reported as oxides, even though essentially no such individual crystals are present):

| Component | Weight Percent |
|---|---|
| $SiO_2$ | 48–64 |
| $Al_2O_3$ | 0–6 |
| MgO | 21–31 |
| CaO | 11–20 |
| Iron Oxide (as FeO) | 4.2–8 |
| $K_2O$ | 0–5 |
| $Na_2O$ | 0–5 |
| $TiO_2$ | 0–3 |
| $Na_2O + K_2O$ | 0–5 |

Preferred ranges for the components are in about the indicated weight percents:

| Component | Weight Percent |
|---|---|
| $SiO_2$ | 52–62 |
| $Al_2O_3$ | 0–5 |
| MgO | 21–30 |
| CaO | 11–18 |
| Iron Oxide (as FeO) | 4.3–7.5 |
| $K_2O$ | 0–4 |
| $Na_2O$ | 0–4 |
| $TiO_2$ | 0–2 |
| $Na_2O + K_2O$ | 0–4 |

More preferred ranges for the components are in about the indicated weight percents:

| Component | Weight Percent |
|---|---|
| $SiO_2$ | 53–58 |
| $Al_2O_3$ | 0–4 |
| MgO | 21–29 |
| CaO | 11–16 |
| Iron Oxide (as FeO) | 4.5–6.5 |
| $K_2O$ | 0–3 |
| $Na_2O$ | 0–3 |
| $TiO_2$ | 0–1.5 |
| $Na_2O + K_2O$ | 0–3 |

The dissolution rate of wool fibers in a saline solution similar to that which is found in the human lung can be increased without sacrificing other necessary glass properties. In order to allow fiberization by currently used methods, the liquidus and viscosity of the composition are both maintained within a fairly narrow range. It is generally desirable to maintain a liquidus temperature significantly below the temperature where the viscosity of the melt is 10 Poise. Liquidus temperature and viscosity provide some constraint on how the wool composition can be altered. Durability provides an additional constraint. The wool fiber should be sufficiently durable to maintain its physical integrity over many years in the location in which it is installed. The wool fibers should not only be fairly inert to moisture attack at the installation site, but also should be capable of dissolving in a physiological medium, such as a human lung. Since both of these situations involve water attack on the wool fibers under near neutral acid-base conditions, this can be met by compositional modifications.

The wool compositions of this invention have a relatively low $Al_2O_3$ content and a relatively high magnesium oxide content. The degree to which the glass dissolution rate can be increased without degrading or changing of the glass properties depends on the starting glass composition. It has been shown that the presence of alumina in a wool composition tends to strengthen the compositional network of the wool and consequently decreases the dissolution rate of the wool in water. It has been discovered that a decrease in the content of alumina in the wool composition provides wools which, in the form of fibers, will degrade more readily in a physiological medium. The content of other major oxides, such as $SiO_2$, CaO, MgO and $K_2O$, in the wool composition can be adjusted to maintain viscosity, liquidus temperature and other properties. Other constituents can be present in the formulations of this invention in trace quantities totaling up to about 3 wt. %.

The compositions of this invention have a high dissolution rate in physiological saline solution of wool fibers, formed from the compositions of this invention, especially due to the low $Al_2O_3$ content, while providing the wool with high temperature resistance and improved fire performance, especially due to the relatively high concentration of MgO in the composition. The compositions of this invention have a sufficiently low liquidus temperature so that the compositions can be formed into fibers by the wheel centrifuge process or the Downey process.

Production of fibers from the above compositions preferably comprises two steps. First, raw materials such as sand, clay, iron oxide, limestone, dolomite, magnesite, basalt, quartzite, high iron steel slag, a high $MgO-SiO_2$ stone or other suitable materials are melted in a crucible, cupola, pot, or continuous glass melting unit, depending upon the quantity of product desired and the manner of fiber formation to be utilized. To produce a mineral wool from the compositions of this invention, one may use any known melting furnace for the production of traditional mineral wool. Either a cupola furnace, a gas fired furnace or an electric furnace is employed. The melts can be produced in a cupola furnace in which a mixture of raw materials is loaded. Also added is the required quantity of coke for causing a burning and melting. If the melts are produced in an electric or gas fired furnace, a reducing agent such as powdered carbon can be added to chemically reduce the melt.

Second, when a suitably homogeneous melt is attained, amorphous fibers are produced from the melt in any conventional manner such as drawing, spinning or blowing. The melt can be fiberized in a conventional multi-wheel centrifuge or a Downey apparatus. The fibers are then collected on a moving screen on which a fiber mat or felt is formed.

Once the fibers have been formed, they are coated with a binder which is provided to cause individual fibers to adhere to each other. The binder is typically sprayed onto the fibers as they are attenuated from the fiber producing apparatus. The binder may also be sprayed onto the fiber felt or mat. The fibers may be coated with a phenolic binder, such as any suitable phenolic binder available in the art. The fibers may also be coated with dedusting agents, antistatic agents, wetting agents and/or hydrophobic agents depending upon the intended use of the fibers. The fibers may also be collected with no binder or coating.

Once the binder and/or other coatings have been applied to the fibers, they are drained, if necessary, and then gradually dried in an air stream or forcibly dried by heating.

EXAMPLE 1

Fibers were produced having the compositions shown in the table below using the processes described above and a wheel centrifuge having four wheels. Two fiber compositions of the invention (A and B) are shown below along with a commercial wool produced by a similar process. The compositions are shown below with amounts of components given in weight percent.

| Component | Composition A | Composition B | Commercial Wool |
| --- | --- | --- | --- |
| $SiO_2$ | 53.02 | 53.24 | 45.63 |
| $Al_2O_3$ | 3.29 | 3.56 | 14.00 |
| MgO | 21.86 | 22.88 | 11.70 |
| CaO | 13.70 | 12.97 | 18.93 |
| $Na_2O$ | 0.25 | 0.26 | 2.00 |
| $K_2O$ | 0.31 | 0.32 | 0.47 |
| $TiO_2$ | 0.37 | 0.36 | 1.57 |
| $P_2O_5$ | 0.06 | 0.03 | 0.08 |
| MnO | 1.02 | 0.92 | 0.18 |
| FeO | 5.94 | 5.50 | 5.33 |

As can be seen from the above data, the compositions of this invention have a decreased concentration of $Al_2O_3$ when compared to a conventional commercial wool formulation. This decreased content of $Al_2O_3$ provides the compositions of this invention with an improved biosolubility when compared to the conventional wool compound. As can also be seen from the above data, the wool compositions of this invention contain a higher concentration of MgO than that of the conventional wool composition. The increased concentration of MgO offers improved performance over the conventional wool composition in terms of resistance to heat. The linear shrink, which is a measure of high temperature resistance in a standard fire test, with lower shrinkage showing better resistance, for the compositions of this invention and the commercial wool were measured. For the compositions given in Table 1 the shrink percentage at 930° C. was approximately 3–4%. For the commercial wool, the shrinkage was shown to be 8–10%. Thus, the compositions of this invention show improvement in high temperature resistance when compared to conventional wool material.

EXAMPLE 2

The following fiber compositions were formulated to have the compositions shown below. The content of these fiber compositions, in approximate weight percent, and their properties are as follows:

| Component/Property | 1 | 2 | 3 | 4 | 5 |
| --- | --- | --- | --- | --- | --- |
| $SiO_2$ | 54.1 | 54.1 | 56.1 | 58.0 | 56.1 |
| $Al_2O_3$ | 0.4 | 0.4 | 2.0 | 2.0 | 2.9 |
| $Na_2O$ | 0.3 | 0.3 | 0.5 | 0.3 | 0.3 |
| $K_2O$ | 0.2 | 0.2 | 0.2 | 0.2 | 0.2 |
| MgO | 29.0 | 21.5 | 22.7 | 22.2 | 22.2 |
| CaO | 11.5 | 19.0 | 12.7 | 11.5 | 11.3 |
| $TiO_2$ | — | — | 0.2 | 0.2 | 0.2 |
| FeO | 4.5 | 4.5 | 5.6 | 5.6 | 6.8 |
| Liquidus (° C.) | 1438 | 1354 | 1355 | 1364 | 1358 |
| Temperature (° C.) for a viscosity of 10 poise | 1375[1] | 1404 | 1440 | 1459 | 1443 |

[1]Approximate value - could not measure below liquidus temperature.

As can seen from the above table, the viscosities of the compositions of this invention allow the compositions to be processed into wool fibers in either a multi-wheel centrifuge process or a Downey process. Fibers were blown from a melt of Composition 4 of Example 2, and the shrinkage when heating to 930° C. was approximately 7%.

One skilled in the art will appreciate that, although the fibers produced by the compositions of this invention have been described as being useful in insulation products, the fibers are useful in any products for which they are suitable. For example, fibers produced from the compositions of this invention can also be used to form acoustical ceiling tiles, acoustical wall panels and fire protection panels.

While certain representative embodiments and details have been shown for purposes of illustrating the invention, it will be apparent to those of skill in the art that various changes and modifications can be made to the compositions of this invention without departing from the scope of the invention, which is defined in the appended claims and their equivalents.

What is claimed is:

1. A mineral fiber having a composition comprising the following components in the indicated weight percents:

| | |
| --- | --- |
| $SiO_2$ | 48–64 |
| $Al_2O_3$ | 0–6 |
| MgO | at least 21–31 |
| CaO | 11–20 |
| Iron Oxide (as FeO) | 4.2–8 |
| $K_2O$ | 0–5 |
| $Na_2O$ | 0–5 |
| $TiO_2$ | 0–3 | wherein the total weight of $Na_2O$ and $K_2O$ does not exceed 5%, the total weight of all components, including trace elements, if any, is 100%, and the mineral fiber is soluble in physiological saline solution.

2. The mineral fiber composition according to claim 1, comprising the following components in the indicated weight percents:

| | |
| --- | --- |
| $SiO_2$ | 52–62 |
| $Al_2O_3$ | 0–5 |
| MgO | at least 21–30 |
| CaO | 11–18 |
| Iron Oxide (as FeO) | 4.3–7.5 |
| $K_2O$ | 0–4 |
| $Na_2O$ | 0–4 |
| $TiO_2$ | 0–2 | wherein the total weight of $Na_2O$ and $K_2O$ does not exceed 4% and the total weight of all components, including trace elements, if any, is 100%.

3. The mineral fiber composition according to claim 2, comprising the following components in the indicated weight percents:

| | |
| --- | --- |
| $SiO_2$ | 53–58 |
| $Al_2O_3$ | 0–4 |
| MgO | at least 21–29 |
| CaO | 11–16 |
| Iron Oxide (as FeO) | 4.5–6.5 |
| $K_2O$ | 0–3 |
| $Na_2O$ | 0–3 |
| $TiO_2$ | 0–1.5 | wherein the total weight of $Na_2O$ and $K_2O$ does not exceed 3% and the total weight of all components, including trace elements, if any, is 100%.

4. The mineral fiber composition according to claim 1, consisting essentially of, by approximate weight percent:

| | |
| --- | --- |
| $SiO_2$ | 54.1 |
| $Al_2O_3$ | 0.4 |
| MgO | 29.0 |
| CaO | 11.5 |
| $Na_2O$ | 0.3 |
| $K_2O$ | 0.2 |
| Iron Oxide (As FeO) | 4.5. |

5. The mineral fiber composition according to claim 1, consisting essentially of, by approximate weight percent

| | |
| --- | --- |
| $SiO_2$ | 54.1 |
| $Al_2O_3$ | 0.4 |
| MgO | 21.5 |
| CaO | 19.0 |
| $Na_2O$ | 0.3 |
| $K_2O$ | 0.2 |
| Iron Oxide (As FeO) | 4.5. |

6. The mineral fiber composition according to claim 3, consisting essentially of, by approximate weight percent:

| | |
| --- | --- |
| $SiO_2$ | 53.02 |
| $Al_2O_3$ | 3.29 |
| MgO | 21.86 |
| CaO | 13.70 |
| $Na_2O$ | 0.25 |
| $K_2O$ | 0.31 |
| $TiO_2$ | 0.37 |
| Iron Oxide (As FeO) | 5.94. |

7. The mineral fiber composition according to claim 3, consisting essentially of, by approximate weight percent:

| | |
|---|---|
| $SiO_2$ | 53.24 |
| $Al_2O_3$ | 3.56 |
| MgO | 22.88 |
| CaO | 12.97 |
| $Na_2O$ | 0.26 |
| $K_2O$ | 0.32 |
| $TiO_2$ | 0.36 |
| Iron Oxide (As FeO) | 5.55. |

8. The mineral fiber composition according to claim 3, consisting essentially of, by approximate weight percent:

| | |
|---|---|
| $SiO_2$ | 56.1 |
| $Al_2O_3$ | 2.0 |
| $Na_2O$ | 0.5 |
| $K_2O$ | 0.2 |
| MgO | 22.7 |
| CaO | 12.7 |
| $TiO_2$ | 0.2 |
| Iron Oxide (As FeO) | 5.6. |

9. The mineral fiber composition according to claim 3, consisting essentially of, by approximate weight percent:

| | |
|---|---|
| $SiO_2$ | 58.0 |
| $Al_2O_3$ | 2.0 |
| $Na_2O$ | 0.3 |
| $K_2O$ | 0.2 |
| MgO | 22.2 |
| CaO | 11.5 |
| $TiO_2$ | 0.2 |
| Iron Oxide (As FeO) | 5.6. |

10. The mineral fiber composition according to claim 2, consisting essentially of, by approximate weight percent:

| | |
|---|---|
| $SiO_2$ | 56.1 |
| $Al_2O_3$ | 2.9 |
| $Na_2O$ | 0.3 |
| $K_2O$ | 0.2 |
| MgO | 22.2 |
| CaO | 11.3 |
| $TiO_2$ | 0.2 |
| Iron Oxide (As FeO) | 6.8. |

11. A mineral fiber insulation material comprising a plurality of mineral fibers including the following components in the indicated weight percents:

| | |
|---|---|
| $SiO_2$ | 48–64 |
| $Al_2O_3$ | 0–6 |
| MgO | at least 21–31 |
| CaO | 11–20 |
| Iron Oxide (as FeO) | 4.2–8 |
| $K_2O$ | 0–5 |
| $Na_2O$ | 0–5 |
| $TiO_2$ | 0–3 | wherein the total weight of $Na_2O$ and $K_2O$ does not exceed 5%, the total weight of all components, including trace elements, if any, is 100%, and the mineral fibers are soluble in physiological saline solution.

12. The mineral fiber insulation material of claim 11, wherein the mineral fibers include the following components in the indicated weight percents:

| | |
|---|---|
| $SiO_2$ | 52–62 |
| $Al_2O_3$ | 0–5 |
| MgO | at least 21–31 |
| CaO | 11–20 |
| Iron Oxide (as FeO) | 4.3–7.5 |
| $K_2O$ | 0–4 |
| $Na_2O$ | 0–4 |
| $TiO_2$ | 0–2 | wherein the total weight of $Na_2O$ and $K_2O$ does not exceed 4% and the total weight of all components including trace elements, if any, is 100%.

13. The mineral fiber insulation material of claim 12, wherein the mineral fibers include the following components in the indicated weight percents:

| | |
|---|---|
| $SiO_2$ | 53–58 |
| $Al_2O_3$ | 0–4 |
| MgO | at least 21–29 |
| CaO | 11–16 |
| Iron Oxide (as FeO) | 4.5–6.5 |
| $K_2O$ | 0–3 |
| $Na_2O$ | 0–3 |
| $TiO_2$ | 0–1.5 | wherein the total weight of $Na_2O$ and $K_2O$ does not exceed 3% and the total weight of all components, including trace elements, if any, is 100%.

14. The mineral fiber insulation material of claim 13, wherein the mineral fibers consist essentially of, by approximate weight percent:

| | |
|---|---|
| $SiO_2$ | 54.1 |
| $Al_2O_3$ | 0.4 |
| MgO | 29.0 |
| CaO | 11.5 |
| $Na_2O$ | 0.3 |
| $K_2O$ | 0.2 |
| Iron Oxide (As FeO) | 4.5. |

15. The mineral fiber insulation material of claim 11, wherein the mineral fibers consist essentially of, by approximate weight percent:

| | |
|---|---|
| $SiO_2$ | 54.1 |
| $Al_2O_3$ | 0.4 |
| MgO | 21.5 |
| CaO | 19.0 |
| $Na_2O$ | 0.3 |
| $K_2O$ | 0.2 |
| Iron Oxide (As FeO) | 4.5. |

16. The mineral fiber insulation material of claim 13, wherein the mineral fibers consist essentially of, by approximate weight percent:

| | |
|---|---|
| SiO$_2$ | 53.02 |
| Al$_2$O$_3$ | 3.29 |
| MgO | 21.86 |
| CaO | 13.70 |
| Na$_2$O | 0.25 |
| K$_2$O | 0.31 |
| TiO$_2$ | 0.37 |
| Iron Oxide (As FeO) | 5.94. |

17. The mineral fiber insulation material of claim 13, wherein the mineral fibers consist essentially of, by approximate weight percent:

| | |
|---|---|
| SiO$_2$ | 53.24 |
| Al$_2$O$_3$ | 3.56 |
| MgO | 22.88 |
| CaO | 12.97 |
| Na$_2$O | 0.26 |
| K$_2$O | 0.32 |
| TiO$_2$ | 0.36 |
| Iron Oxide (As FeO) | 5.50. |

18. The mineral fiber insulation material of claim 13, wherein the mineral fibers consist essentially of, by approximate weight percent:

| | |
|---|---|
| SiO$_2$ | 56.1 |
| Al$_2$O$_3$ | 2.0 |
| Na$_2$O | 0.5 |
| K$_2$O | 0.2 |
| MgO | 22.7 |
| CaO | 12.7 |
| TiO$_2$ | 0.2 |
| Iron Oxide (As FeO) | 5.6. |

19. The mineral fiber insulation material of claim 13, wherein the mineral fibers consist essentially of, by approximate weight percent:

| | |
|---|---|
| SiO$_2$ | 58.0 |
| Al$_2$O$_3$ | 2.0 |
| Na$_2$O | 0.3 |
| K$_2$O | 0.2 |
| MgO | 22.2 |
| CaO | 11.5 |
| TiO$_2$ | 0.2 |
| Iron Oxide (As FeO) | 5.6. |

20. The mineral fiber insulation material of claim 12, wherein the mineral fibers consist essentially of, by approximate weight percent:

| | |
|---|---|
| SiO$_2$ | 56.1 |
| Al$_2$O$_3$ | 2.9 |
| Na$_2$O | 0.3 |
| K$_2$O | 0.2 |
| MgO | 22.2 |
| CaO | 11.3 |
| TiO$_2$ | 0.2 |
| Iron Oxide (As FeO) | 6.8. |

* * * * *

UNITED STATES PATENT AND TRADEMARK OFFICE
CERTIFICATE OF CORRECTION

PATENT NO. : 6,077,798
DATED : June 20, 2000
INVENTOR(S) : Charles R. Rapp

It is certified that error appears in the above-identified patent and that said Letters Patent is hereby corrected as shown below:

Claim 12, line 10 should read:

CaO          11-18 [11-20]

Signed and Sealed this

Twenty-second Day of May, 2001

NICHOLAS P. GODICI

*Attest:*

*Attesting Officer*      *Acting Director of the United States Patent and Trademark Office*